(12) United States Patent
Abe

(10) Patent No.: US 9,207,803 B2
(45) Date of Patent: Dec. 8, 2015

(54) TOUCH PANEL CONTROL CIRCUIT

(71) Applicant: ROHM CO., LTD., Kyoto (JP)

(72) Inventor: Shinichi Abe, Kyoto (JP)

(73) Assignee: ROHM CO., LTD. (JP)

( * ) Notice: Subject to any disclaimer, the term of this patent is extended or adjusted under 35 U.S.C. 154(b) by 169 days.

(21) Appl. No.: 13/961,415

(22) Filed: Aug. 7, 2013

(65) Prior Publication Data
US 2014/0168113 A1    Jun. 19, 2014

Related U.S. Application Data

(63) Continuation of application No. PCT/JP2012/000804, filed on Feb. 7, 2012.

(30) Foreign Application Priority Data

Feb. 8, 2011   (JP) ................................. 2011-025017

(51) Int. Cl.
G06F 3/041        (2006.01)
G06F 3/045        (2006.01)

(52) U.S. Cl.
CPC .............. G06F 3/0416 (2013.01); G06F 3/045 (2013.01); *G06F 2203/04104* (2013.01)

(58) Field of Classification Search
CPC .................... G09G 3/3241; G09G 2300/0861; G09G 2300/0809
See application file for complete search history.

(56) References Cited

U.S. PATENT DOCUMENTS

| | | | | |
|---|---|---|---|---|
| 4,929,934 | A * | 5/1990 | Ueda et al. ..................... | 345/174 |
| 6,208,332 | B1 * | 3/2001 | Ikegami ......................... | 345/174 |
| 2003/0122796 | A1 * | 7/2003 | Kong ............................. | 345/173 |
| 2004/0217945 | A1 * | 11/2004 | Miyamoto et al. ............. | 345/173 |
| 2007/0188155 | A1 * | 8/2007 | Oki et al. ....................... | 323/280 |
| 2011/0025642 | A1 | 2/2011 | Tada et al. | |
| 2011/0069029 | A1 * | 3/2011 | Ryu et al. ....................... | 345/173 |

FOREIGN PATENT DOCUMENTS

| | | |
|---|---|---|
| JP | 07-160402 A | 6/1995 |
| JP | 09034625 A | 2/1997 |
| JP | 2007-156875 A | 6/2007 |
| JP | 2009-048233 A | 3/2009 |
| JP | 2010-092347 A | 4/2010 |
| JP | 2011-076591 A | 4/2011 |

OTHER PUBLICATIONS

International Preliminary Report on Patentability with Written Opinon for International Application No. PCT/JP2012/000804; Date of Issuance: Aug. 13, 2013, with English Translation.

(Continued)

*Primary Examiner* — Alexander Eisen
*Assistant Examiner* — Nan-Ying Yang
(74) *Attorney, Agent, or Firm* — Cantor Colburn LLP

(57) ABSTRACT

A voltage generating unit includes an output transistor arranged as a first-terminal side extension of a path that includes a first terminal, a first resistive film, and a second terminal, and is configured to apply a first bias voltage to the first terminal. A current detection unit includes a detection transistor connected to the output transistor such that they form a current mirror circuit, a detection resistor arranged on a path of the detection transistor, and an amplifier circuit configured to amplify the difference between a voltage drop across a detection resistor and a predetermined voltage, and to output the difference thus amplified as a value which represents a panel current.

28 Claims, 9 Drawing Sheets

(56) References Cited

OTHER PUBLICATIONS

International Search Report for International Application No. PCT/JP2012/000804; Date of Mailing: May 15, 2012, with English Translation.

Hiroyuki Washino, "Advanced Technologies for Digital Media," Mitsubishi Denki Giho (Technical reports from Mitsubishi Electric Corporation), (Japan: Mitsubishi Electric Engineering Company Limited, Dec. 25, 2008), vol. 82, No. 12, pp. 43-46.

Japanese Notification of Reason(s) for Refusal corresponding to Patent Application No. 2011-025017; Dispatch Date: Mar. 10, 2015, with English translation.

* cited by examiner

TOUCH PANEL CONTROL CIRCUIT

This application is a continuation under 35 U.S.C. §120 of PCT/JP2012/000804, filed Feb. 7, 2012, which is incorporated herein reference and which claimed priority to Japanese Application No. 2011-025017, filed Feb. 8, 2011. The present application likewise claims priority under 35 U.S.C. §119 to Japanese Application No. 2011-025017, filed Feb. 8, 2011, the entire content of which is also incorporated herein by reference.

BACKGROUND OF THE INVENTION

1. Field of the Invention

The present invention relates to a resistive film touch panel, and particularly to a technique for detecting a simultaneous touch state (multi-touch state) in which the user touches multiple points.

2. Description of the Related Art

In recent years, it has become mainstream for electronic devices such as computers, cellular phone terminals, PDAs (Personal Digital Assistants), etc., to include an input apparatus which allows the user to operate the electronic device by using the fingers to touch the input apparatus. Known examples of such input apparatuses include resistive film touch panels (touch sensors). A related technique is disclosed in Japanese Patent Application Laid Open No. 2009-48233.

In recent years, there is a demand for a touch panel which supports multi-touch operations. However, such touch panels have been realized only as electrostatic sensor touch panels, and have not been realized as resistive film touch panels. This is because, with such a resistive film touch panel, a position (coordinate) touched by the user is determined based on the voltage output from the panel. However, such an arrangement is not capable of distinguishing between the output voltage of the panel in a case in which the user touches two positions (multi-touch operation) and the output voltage thereof in a case in which the user touches a single position (single touch operation).

Patent document JP2009-48233 discloses a touch panel input apparatus which allows the user to perform multi-touch operations. However, this touch panel input apparatus handles such multi-touch operations as an input error. That is to say, such an arrangement does not actively support multi-touch operations as valid input operations. Thus, no technique has been disclosed which identifies the multiple coordinates involved in such a multi-touch operation.

SUMMARY OF THE INVENTION

The present invention has been made in order to solve such a problem. Accordingly, it is an exemplary purpose of an embodiment of the present invention to provide a touch panel control technique for supporting multi-touch operations.

An embodiment of the present invention relates to a control circuit for a touch panel. The touch panel comprises a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal. The control circuit comprises: a voltage generating unit configured to apply a predetermined first bias voltage and a predetermined second bias voltage to the first and second terminals, respectively; a voltage detection unit configured to detect a panel voltage that occurs at the third terminal; a current detection unit configured to detect a panel current that flows through a path including the first terminal, the first resistive film, and the second terminal; and a coordinate determination unit configured to detect coordinates which a user touched, based on the panel voltage and the panel current. The voltage generating unit comprises a regulator configured to apply the first bias voltage to the first terminal. The regulator includes an output transistor arranged on the path including the first terminal, the first resistive film, and the second terminal. The current detection unit comprises: a detection transistor connected to the output transistor such that they form a current mirror circuit; a detection resistor arranged on a path of the detection transistor; and an amplifier circuit configured to amplify a difference between a voltage drop across the detection resistor and a predetermined voltage, and to output the difference thus amplified as a value which represents the panel current.

When the user touches multiple points on the touch panel, the combined resistance value of a path from the first terminal to the second terminal drops, which provides a corresponding change in the panel current. With such an embodiment, by monitoring the panel current, such an arrangement is capable of appropriately detecting the multi-touch state. Furthermore, such an arrangement is capable of determining the coordinates of the multiple points. Moreover, the detection resistor configured to detect the panel current is arranged on a path that differs from a path including the first terminal, the first resistive film, and the second terminal. Thus, such an arrangement is capable of detecting the panel current without affecting the panel voltage. In addition, by optimizing the predetermined voltage, such an arrangement allows the amplifier circuit to output an output voltage which is proportional to a change in the panel current that corresponds to a touch on the touch panel. Such an arrangement allows the multi-touch state to be detected even if the first resistive film and the second resistive film of the touch panel have a large contact resistance.

Another embodiment of the present invention also relates to a control circuit. The control circuit comprises: a voltage generating unit configured such that, in a first state, a predetermined first bias voltage and a predetermined second bias voltage are applied to the first and second terminals, respectively, and the third and fourth terminals are each set to a high impedance state, and such that, in a second state, the predetermined first and second bias voltages are applied to the third and fourth terminals, respectively, and the first and second terminals are each set to the high impedance state; a voltage detection unit configured to detect a panel voltage that occurs at one from among the third and fourth terminals in the first state, and to detect a panel voltage that occurs at one from among the first and second terminals in the second state; a current detection unit configured to detect a panel current that flows through a path including the first terminal, the first resistive film, and the second terminal in the first state, and to detect a panel current that flows through a path including the third terminal, the second resistive film, and the fourth terminal in the second state; and a coordinate determination unit configured to detect coordinates which the user touched, based on the values of the panel voltage and the panel current. The voltage generating unit comprises: a regulator comprising an output transistor, and configured to generate the first bias voltage; and a selector, having its input terminal supplied with the first bias voltage, having its first output terminal connected to the first terminal, and having its second output terminal connected to the third terminal, and configured such that its first output terminal side is turned on in the first state and its second output terminal side is turned on in the second state. The current detection unit comprises: a detection transistor connected to the output transistor such that they form a current mirror circuit; a detection resistor arranged on a path of the detection transistor; and an amplifier circuit configured to amplify a difference between a voltage drop across the detection resistor and a predetermined voltage, and to output the difference thus amplified as a value which represents the panel current.

With such an embodiment, the multi-touch state and the coordinates of multiple points can be detected in both the X direction and the Y direction. Furthermore, the detection resistor configured to detect the panel current is not directly connected to the touch panel. Thus, such an arrangement is capable of detecting the panel current without affecting the panel voltage. Moreover, by optimizing the predetermined voltage, such an arrangement allows the amplifier circuit to output an output voltage which is proportional to a change in the panel current that corresponds to a touch on the touch panel. In addition, such an arrangement allows the multi-touch state to be detected even if the first resistive film and the second resistive film of the touch panel have a large contact resistance.

Yet another embodiment of the present invention also relates to a control circuit. The control circuit comprises: a voltage generating unit configured such that, in a first state, a predetermined first bias voltage and a predetermined second bias voltage are applied to the first and second terminals, respectively, and the third and fourth terminals are each set to a high impedance state, and such that, in a second state, the predetermined first and second bias voltages are applied to the third and fourth terminals, respectively, and the first and second terminals are each set to the high impedance state; a voltage detection unit configured to separately detect panel voltages that respectively occur at the third and fourth terminals in the first state, and to separately detect panel voltages that respectively occur at the first and second terminals in the second state; a current detection unit configured to detect a panel current that flows through a path including the first terminal, the first resistive film, and the second terminal in the first state, and to detect a panel current that flows through a path including the third terminal, the second resistive film, and the fourth terminal in the second state; and a coordinate determination unit configured to detect coordinates which the user touched, based on the values of the panel voltage and the panel current. The voltage generating unit comprises: a regulator comprising an output transistor, and configured to generate the first bias voltage; and a selector, having its input terminal supplied with the first bias voltage, having its first output terminal connected to the first terminal, and having its second output terminal connected to the third terminal, and configured such that its first output terminal side is turned on in the first state and its second output terminal side is turned on in the second state. The current detection unit comprises: a detection transistor connected to the output transistor such that they form a current mirror circuit; a detection resistor arranged on a path of the detection transistor; and an amplifier circuit configured to amplify a difference between a voltage drop across the detection resistor and a predetermined voltage, and to output the difference thus amplified as a value which represents the panel current.

Also, the amplifier circuit may comprise: a buffer configured to receive the voltage drop across the detection resistor; an operational amplifier; a first resistor arranged between an output terminal of the buffer and a first input terminal of the operational amplifier; a second resistor arranged between the first input terminal of the operational amplifier and a fixed voltage terminal; a third resistor having one end supplied with a predetermined voltage, and having its other end connected to a second input terminal of the operational amplifier; and a fourth resistor arranged between the second input terminal of the operational amplifier and an output terminal of the operational amplifier.

Also, the voltage detection unit may comprise: a buffer configured to receive the panel voltage; and an A/D converter configured to sample and hold an output voltage of the buffer, and to convert the value thus sampled and held into a digital value.

In a case in which the voltage detection unit does not include such a buffer, the capacitor of the input stage of the A/D converter is charged via the contact resistance of the panel. Thus, in a case in which the panel has a large contact resistance, such an arrangement requires a long period of time for the sample and hold operation. In order to solve such a problem, the voltage detection unit includes such a buffer having a low output impedance. Such an arrangement provides a reduced sample and hold time even if the contact resistance of the panel is large.

Also, the current detection unit may be configured to be capable of switching, according to the first state and the second state, a mirror ratio of a mirror circuit that comprises the output transistor and the detection transistor.

Also, the current detection unit may be configured to be capable of switching, according to the first state and the second state, a resistance value of the detection resistor.

In a case in which there is a large difference between the vertical length of the touch panel and the horizontal length thereof (i.e., in a case in which the touch panel is configured with a large aspect ratio), in some cases, there is a difference in the combined resistance between the vertical direction and the horizontal direction. Thus, it is assumed that, in some cases, there is a difference in the panel current ranges of the X direction and the Y direction. Even in such a case, by switching the mirror ratio or otherwise the resistance value of the detection resistor, such an arrangement is capable of providing matching of the ranges of the voltage drops that occur at the detection resistor in both the X direction and the Y direction.

Also, the coordinate determination unit is configured to judge that the user is touching multiple points when the value of the panel current is greater than a predetermined value.

Also, the control circuit may be configured such that, when the user is touching two points, an interval between the coordinates of the two points is determined based on the value of the panel current. Also, the control circuit may be configured to judge that the interval between the coordinates of the two points becomes greater as the panel current becomes greater.

When the user is touching the two points, the path between the two points is configured as the first resistive film and the second resistive film connected in parallel. Accordingly, the combined resistance of a path from the first terminal up to the second terminal is reduced, thereby increasing the panel current. As the distance between the two points is greater, the distance of the path thus configured as the first resistive film and the second resistive film connected in parallel becomes greater. This reduces the combined resistance, thereby increasing the panel current. Thus, such an arrangement is capable of determining the interval between the coordinates of the two points based on the panel current.

Also, the control circuit may be configured to determine the interval between the coordinates of the two points based on a difference between the panel current measured when the user is not touching the panel and the panel current measured when the user touched the panel.

Also, the coordinate determination unit may be configured to determine a midpoint coordinate between the two points based on the panel voltage, to add a value that corresponds to the interval of the coordinates of the two points to the midpoint coordinate thus determined so as to determine one from among the coordinates of the two points, and to subtract a value that corresponds to the interval of the coordinates of the two points from the midpoint coordinate thus determined so as to determine the other of the coordinates of the two points.

Yet another embodiment of the present invention relates to a touch panel input apparatus. The input apparatus comprises a touch panel and any of the aforementioned control circuits configured to control the touch panel.

Yet another embodiment of the present invention relates to an electronic device. The electronic device includes the aforementioned touch panel input apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 1:
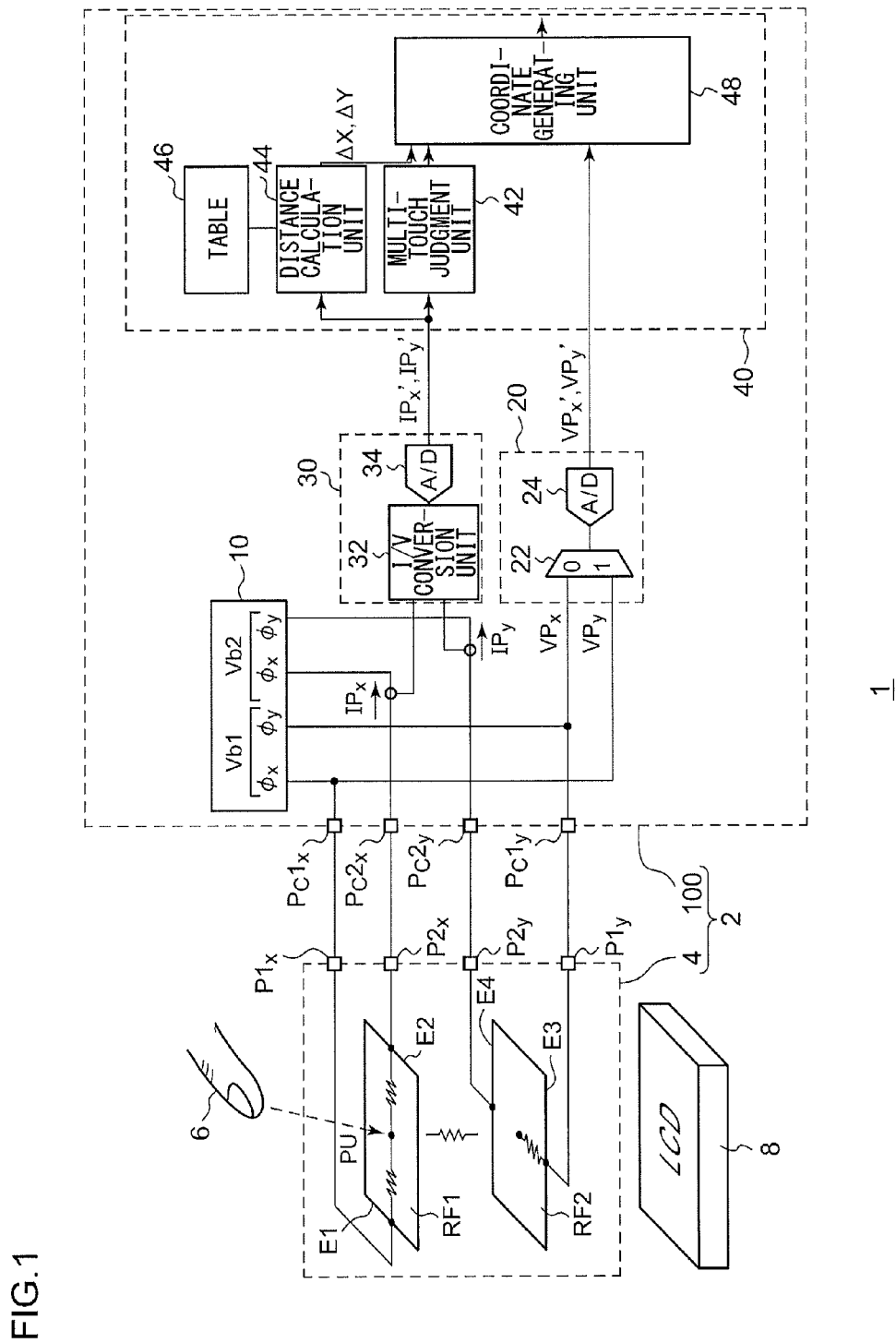
FIG. 1 is a block diagram which shows a configuration of an electronic device including a touch panel input apparatus according to an embodiment.

FIG. 1 is a block diagram which shows a configuration of an electronic device 1 including a touch panel input apparatus (which will simply be referred to as the "input apparatus") 2 according to an embodiment. The input apparatus 2 is arranged on a surface layer of an LCD (Liquid Crystal Display) 8, for example, and functions as a touch panel. The input apparatus 2 is configured to identify the X-coordinates and the Y-coordinates of points (positions) touched by the user via a finger, a pen, or the like (which will collectively be referred to as the "finger 6" hereafter).

The input apparatus 2 includes a touch panel 4 and a control circuit 100. The touch panel 4 is configured as a four-line (four-terminal) resistive film touch panel. The touch panel 4 has a typical configuration, and accordingly, a brief description thereof will be made below.

The touch panel 4 includes a first terminal P1x through a fourth terminal P2y, a first resistive film RF1, and a second resistive film RF2.

The first resistive film RF1 and the second resistive film RF2 are arranged such that one is overlaid on the other with a gap between them in the Z-axis direction, which is orthogonal to the X-axis and the Y-axis. An edge E1 of the first resistive film RF1, which is orthogonal to the X axis, is connected to the first terminal P1x. An edge E2, which is opposite to the edge E1, is connected to the second terminal P2x. The third terminal P1y is connected to an edge E3 of the second resistive film RF2 which extends in parallel with the X axis. The fourth terminal P2y is connected to an edge E4 which is opposite to the edge E3 of the second resistive film RF2.

The above is the structure of the touch panel 4.

The control circuit 100 is configured to detect a position touched by the user while switching states in a time sharing manner between a first state ϕx in which the X direction coordinate is detected and a second state ϕy in which the Y direction coordinate is detected.

The control circuit 100 includes a first terminal Pc1x through a fourth terminal Pc2y, a voltage generating unit 10, a voltage detection unit 20, a current detection unit 30, and a calculation unit 40.

The first terminal Pc1x through the fourth terminal Pc2y are connected to the corresponding terminals on the touch panel 4 side, i.e., are respectively connected to the first terminal P1x through the fourth terminal P2y.

First, description will be made regarding the configuration for detecting the X direction coordinate (X-coordinate).

In the first state ϕx, the voltage generating unit 10 is configured to apply a predetermined first bias voltage Vb1 and a predetermined second bias voltage Vb2 to the first terminal P1x and the second terminal P2x, respectively. Here, the relation Vb1>Vb2 is taken to be satisfied. The second bias voltage Vb2 is preferably set to the ground voltage (0 V). Furthermore, in the first state, the voltage generating unit 10 is configured to set each of the third terminal P1y and the fourth terminal P2y to the high-impedance state.

In the first state ϕx, the voltage detection unit 20 is configured to detect a panel voltage VPx that occurs at the third terminal P1y. The voltage detection unit 20 includes an A/D converter 24, and is configured to convert the first panel voltage VPx into a digital signal VPx'.

In the first state φx, the current detection unit 30 is configured to detect a panel current IPx that flows through a path including the first terminal P1x, the first resistive film RF1, and the second terminal P2x. The current detection unit 30 includes an I/V conversion unit 32 configured to convert the panel current IPx into a voltage signal, and an A/D converter 34 configured to convert the voltage signal into a digital signal VPx'.

The calculation unit (coordinate determination unit) 40 is configured to determine the X-coordinate of the point PU touched by the user based on the values of the panel voltage VPx' and the panel current IPx'.

Next, description will be made regarding a configuration for detecting the Y direction coordinate (Y-coordinate).

In the second state φy, the voltage generating unit 10 is configured to apply a predetermined first bias voltage Vb1 and a predetermined second bias voltage Vb2 to the third terminal P1y and the fourth terminal P2y, respectively. Furthermore, in the second state φy, the voltage generating unit 10 is configured to set each of the first terminal P1x and the second terminal P2x to the high-impedance state. The first bias voltage Vb1 used in the first state φx may be the same as that used in the second state φy, or they may be different. Description will be made below regarding an arrangement in which the first bias voltage Vb1 used in the first state is the same as that used in the second state. The same can be said of the configuration in which the second bias voltage Vb2 is applied.

In the second state φy, the voltage detection unit 20 is configured to detect a panel voltage VPy that occurs at the first terminal P1x. The A/D converter 24 is configured to convert the panel voltage VPy thus detected into a digital signal VPy'. The voltage detection unit 20 includes a two-input selector 22, and is arranged such that its first input terminal (0) is connected to the third terminal P1y, and its second input terminal (1) is connected to the first terminal P1x. The selector 22 is configured to select the first input (0) side in the first state φx, and to select the second input (1) side in the second state φy.

It should be noted that, in the first state φx, the voltage detection unit 20 may be configured to measure the voltage that occurs at the fourth terminal P2y as the panel voltage VPx, instead of or otherwise in addition to the third terminal P1y. Similarly, in the second state φy, the voltage detection unit 20 may be configured to measure the voltage that occurs at the second terminal P2x as the panel voltage VPy, instead of or otherwise in addition to the first terminal P1x.

In the second state φy, the current detection unit 30 is configured to detect a panel current IPy that flows through a path including the third terminal P1y, the second resistive film RF2, and the fourth terminal P2y. The I/V conversion unit 32 is configured to convert the panel current IPy into a voltage signal. The A/D converter 34 is configured to convert the voltage signal thus generated into a digital value IPy'.

The calculation unit (coordinate determination unit) 40 is configured to detect the Y-coordinate of the point PU touched by the user, based on the values of the panel voltage VPy' and the panel current IPy'.

That is to say, in the first state φx, the third terminal P1y functions as a terminal for detecting the panel voltage VPx. In the second state φy, the third terminal P1y functions as a terminal for applying the bias voltage Vb2 to the second resistive film RF2. Similarly, in the second state φy, the first terminal P1x functions as a terminal for detecting the panel voltage VPy. In the first state φx, the first terminal P1x functions as a terminal for applying the bias voltage Vb1 to the first resistive film RF1. It should be noted that the fourth terminal P2y may be employed as a terminal for detecting the panel voltage VPx, instead of the third terminal P1y. Also, the second terminal P2x may be employed as a terminal for detecting the panel voltage VPy, instead of the first terminal P1x.

The above is the overall configuration of the control circuit 100. Next, description will be made regarding a mechanism for coordinate detection by means of the control circuit 100. Description will be made below regarding a mechanism for detecting the X-coordinate in the first state φx. The same can be said of detection of the Y-coordinate.

Figure 2A:
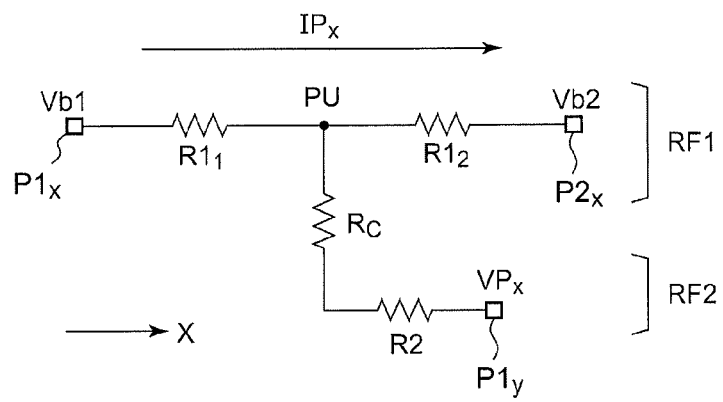
FIGS. 2A and 2B are circuit diagrams showing equivalent circuits in a single-touch state and a multi-touch state, respectively.
Figure 2B:
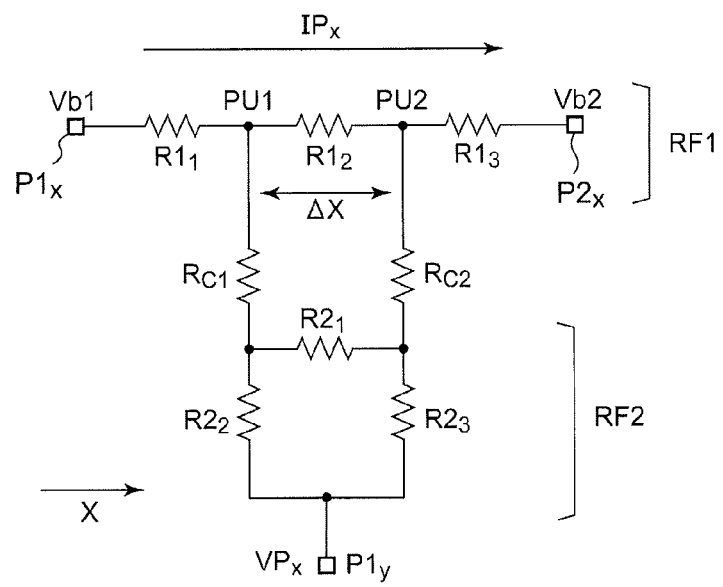

FIGS. 2A and 2B are equivalent circuit diagrams which show a circuit for the single-touch state and a circuit for the multi-touch state, respectively. It should be noted that, in actuality, each resistor shown in each equivalent circuit diagram is the result of distributed parameters. However, discrete resistor elements are shown in the drawings for simplicity of description.

[Single-Touch State]

Referring to FIG. 2A, when the user touches a single point PU, the first resistive film RF1 is partitioned into a resistor $R1_1$ that corresponds to a region between the first terminal P1x and the point PU and a resistor $R1_2$ that corresponds to a region between the point PU and the second terminal P2x. The first resistive film RF1 and the second resistive film RF2 are in contact at the point PU, and the contact resistance thereof is represented by Rc. The resistance of a path of the second resistive film RF2 from the point PU to the third terminal P1y is represented by R2.

The electric potential at the point PU is a voltage obtained by dividing the voltage difference between the bias voltage Vb1 and the bias voltage Vb2 by the resistors $R1_1$ and $R1_2$. Accordingly, the electric potential at the point PU represents the X-coordinate of the point PU. The electric potential at the point PU is approximately the same as that at the third terminal P1y. That is to say, the panel voltage VPx that occurs at the third terminal P1y represents the X-coordinate of the point PU.

Known techniques can be employed as an algorithm used to derive the X-coordinate based on the panel voltage VPx. The algorithm used in the present invention is not restricted in particular.

For the impedance on the control circuit 100 side seen at the third terminal P1y to be sufficiently high, the panel current IPx flows through a path formed of the first terminal P1x, the resistors $R1_1$ and $R1_2$, and the second terminal P2x. That is to say, the impedance Zs of a path between the first terminal P1x and the second terminal P2x is represented by $Zs=R1_1+R1_2$. The impedance Zs can be considered to be constant regardless of the position of the contact point PU. Furthermore, the impedance Zs is approximately the same as the impedance Zo when the user does not touch the panel. That is to say, the relation $Zs \approx Zo$ is satisfied.

Hereafter, the impedance in the non-contact state will not be distinguished in particular from the impedance in the single-touch state. These impedances will collectively be referred to as the "reference impedance Zo".

The panel current IPx that flows from the first terminal P1x to the second terminal P2x in either the single-touch state or in the non-contact state is represented by $IPxo=(Vb1-Vb2)/Zo$.

The panel current IPxo will be referred to as the "reference panel current".

[Multi-Touch State]

Referring to FIG. 2B, when the user touches two points PU1 and PU2, the first resistive film RF1 is partitioned into a resistor $R1_1$ that corresponds to a region between the first terminal P1x and the point PU1, a resistor $R1_2$ that corresponds to a region between the point PU1 and the point PU2, and a resistor $R1_3$ that corresponds to a region between the point PU2 and the second terminal P2x. The first resistive film RF1 and the second resistive film RF2 are in contact at the points PU1 and PU2. The contact resistances at the points PU1 and PU2 are represented by $R_{c1}$ and $R_{c2}$.

With regard to the second resistive film RF2, the resistance that corresponds to a region between the points PU1 and PU2 is represented by $R2_1$, the resistance of a path from the point PU1 to the third terminal P1y is represented by $R2_2$, and the resistance of a path from the point PU2 to the third terminal P1y is represented by $R2_3$.

The panel current IPx in the multi-touch state is determined by the combined impedance Zm that corresponds to a path between the first terminal P1x and the second terminal P2x. The relation between the combined impedance Zm and the impedance Zo in either the non-contact state or the single-touch state is represented by Zm<Zo.

Thus, the relation between the panel current IPxm in the multi-touch state and the reference panel current IPxo is represented by IPxm>IPxo.

That is to say, by monitoring the panel current IPx, and by comparing the panel current IPx thus monitored with the reference panel current IPxo, such an arrangement is capable of distinguishing between the multi-touch state and the single-touch state (and the non-contact state).

The electric potentials at the points PU1 and PU2 are each voltages obtained by dividing the voltage difference between the bias voltages Vb1 and Vb2 with the resistors $R1_1$, $R1_2$, and $R1_3$ and other resistance components. Accordingly, there is a correlation between the electric potentials at the points PU1 and PU2 and their respective X-coordinates. Furthermore, there is a correlation between the panel voltage VPx that occurs at the third terminal P1y and the positions of the points PU1 and PU2. Accordingly, when the multi-touch state is detected, the coordinates of the points PU1 and PU2 can be estimated based on the panel voltage VPx.

More specifically, an X-coordinate X3 determined based on the panel voltage VPx using the same algorithm as in the single-touch state represents a point positioned between the points PU1 and PU2 touched by the user. That is to say, with the X-coordinates of the points PU1 and PU2 actually touched by the user as X1 and X2, the relation X1<X3<X2 holds true.

That is to say, the coordinates of the points PU1 and PU2 can be estimated using the coordinate X3, the derivation of which is based on the panel voltage VPx. Description will be made later regarding the estimation algorithm.

As described above, with the control circuit 100 according to the embodiment, the panel current IPx is monitored in addition to the panel voltage VPx, and processing is performed on a combination of the panel voltage VPx and the panel current IPx thus monitored. Thus, such an arrangement is capable of determining the coordinates of user touch points not only in the single-touch state, but also in the multi-touch state.

Next, description will be made regarding a specific example configuration of the calculation unit 40 and the processing operation thereof.

The calculation unit 40 includes a multi-touch judgment unit 42, a distance calculation unit 44, a table 46, and a coordinate generating unit 48.

Figure 3:
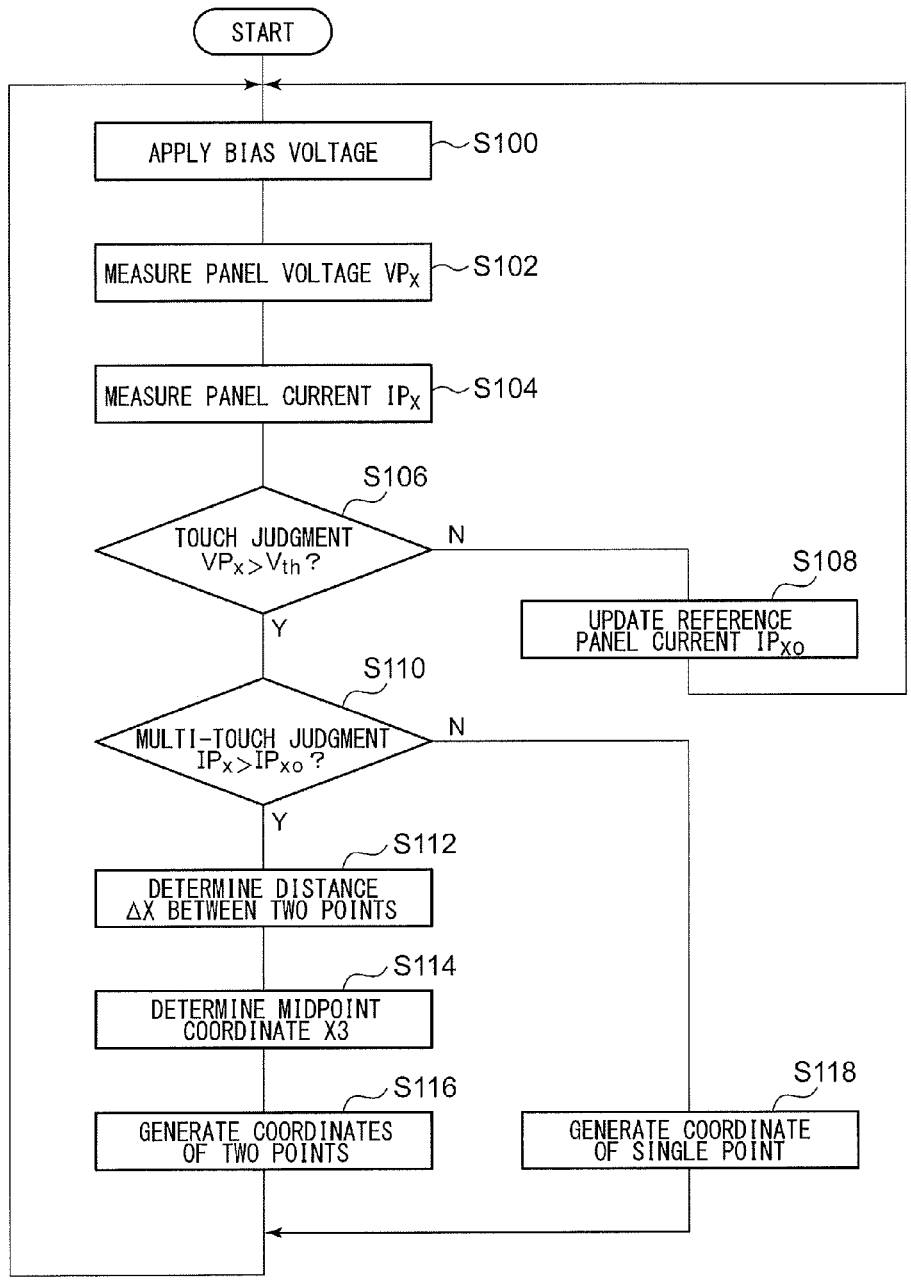
FIG. 3 is a flowchart which shows processing performed by the control circuit shown in FIG. 1.

FIG. 3 is a flowchart which shows processing performed by the control circuit 100 shown in FIG. 1. The flow shown in FIG. 3 shows the processing used to determine the X-coordinate in the first state φx. It should be noted that, to such an extent that the processing is not adversely affected, the sequence of the steps can be rearranged, or several steps can be simultaneously executed in a parallel manner.

First, the voltage generating unit 10 applies the bias voltages Vb1 and Vb2 to the first terminal P1x and the second terminal P2x, respectively (S100). In this state, the voltage detection unit 20 measures the panel voltage VPx (S102), and the current detection unit 30 measures the panel current IPx (S104).

The calculation unit 40 receives the digital values VPx' and IPx' that correspond to the panel voltage VPx and the panel current IPx thus obtained.

Subsequently, judgment is made regarding whether or not the user touched the panel (S106). When the user touches a point having a low X-coordinate (in the vicinity of the edge E1), the panel voltage VPx is high, and when the user touches a point having a high X-coordinate (in the vicinity of the edge E2), the panel voltage VPx is low. In the non-contact state, no voltage is applied to the third terminal P1y. Accordingly, in this state, the panel voltage VPx is approximately zero.

Thus, the coordinate generating unit 48 judges whether or not the user touched the panel, by comparing the panel voltage VPx with a predetermined threshold voltage Vth. The threshold voltage Vth is set to a value in the vicinity of 0 V.

When VPx>Vth ("YES" in S106), judgment is made that the user touched the panel. Subsequently, the multi-touch judgment unit 42 judges whether or not a multi-touch operation was performed (S110). Judgment of whether or not a multi-touch operation was performed is made by comparing the panel current IPx with a predetermined reference current IPxo, as described above.

When IPx<IPxo ("NO" in S110), the multi-touch judgment unit 42 judges that a single-touch operation was performed, and notifies the coordinate generating unit 48 of this judgment result. The coordinate generating unit 48 determines the X-coordinate based on the panel voltage VPx (S118).

When IPx>IPxo ("YES" in S110), the multi-touch judgment unit 42 judges that a multi-touch operation was performed, and notifies the distance calculation unit 44 and the coordinate generating unit 48 of this judgment result.

If judgment is made that a multi-touch operation was performed, the distance calculation unit 44 determines the distance ΔX between the two points PU1 and PU2 (S112).

The present inventor has come to recognize that there is a correlation between the distance ΔX between the two points PU1 and PU2 and the panel current IPx. That is to say, when the distance ΔX between the two points is zero, the state is equivalent to that of a single-touch operation, and therefore the panel current IPx is approximately the same as the reference current IPxo.

Figure 4A:
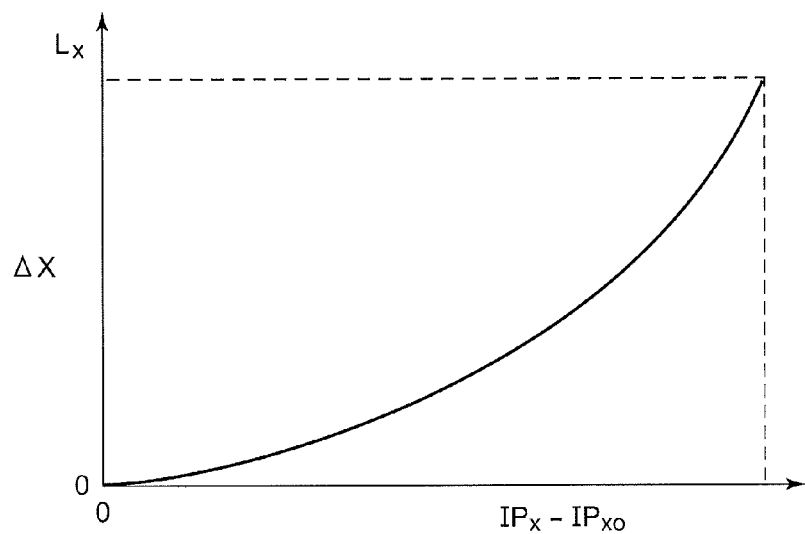
FIGS. 4A and 4B are a graph and a diagram each showing the relation between the panel current and the points in the multi-touch state.
Figure 4B:
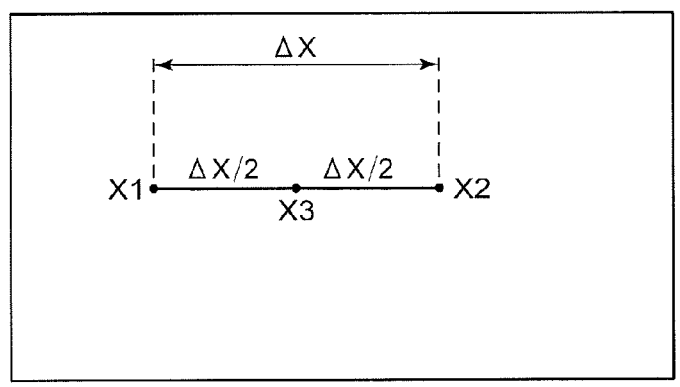

FIGS. 4A and 4B are a graph and a diagram each showing the relation between the panel current and the points in the multi-touch state.

As the distance ΔX between the two points increases, the length of the region which is equivalent to the resistors $R1_2$ and $R2_1$ connected in parallel increases. Accordingly, the combined impedance Zm of a path between the first terminal P1x and the second terminal P2x drops. Thus, the panel current IPx increases according to the drop in the combined impedance Zm. When the distance ΔX between the two points reaches the length Lx of the panel in the X-axis direction, the panel current IPx exhibits the minimum value IPxmin.

That is to say, there is a one-to-one correspondence between the panel current IPx and the distance ΔX between the two points. In other words, there is a one-to-one correspondence between the distance ΔX and the current difference (IPx–IPxo) between the panel current IPx and the reference current IPxo. FIG. 4A is a graph which shows the relation between the current difference (IPx–IPxo) and the distance ΔX.

The characteristics shown in FIG. 4A may preferably be measured beforehand for each touch panel 4. Alternatively, the characteristics shown in FIG. 4A may be calculated by simulation. The table 46 stores the relation between the current difference (IPx–IPxo) and the distance ΔX.

The distance calculation unit 44 determines the corresponding distance ΔX, based on the panel current IPx with reference to the table 46, and outputs the distance ΔX thus determined to the coordinate generating unit 48. It should be noted that an arrangement may be made in which an approximate analytical equation which represents the characteristics shown in FIG. 4A is stored, and the distance ΔX is obtained by calculation, instead of an arrangement employing the table 46.

The coordinate generating unit 48 receives the data which represent the distance ΔX and the panel voltage VPx. The coordinate generating unit 48 calculates the X-coordinate X3 that corresponds to the panel voltage VPx using the same algorithm as that used in the single-touch state, or an algorithm that is different from that used in the single-touch state. The X-coordinate X3 thus calculated is taken as the midpoint coordinate between the two points (S114).

The coordinate generating unit 48 determines the X-coordinate PU2 of one of the two points by adding a value ΔX/2, which corresponds to the interval ΔX between the two coordinates (in this example, half the interval ΔX), to the coordinate of the midpoint X3, and determines the X-coordinate PU1 of the other of the two points by subtracting, from the coordinate of the midpoint X3, the value ΔX/2 which corresponds to the interval ΔX between the two coordinates (S116). FIG. 4B shows this processing. Subsequently, the flow returns to Step S100.

Referring to Step S106 again, when VPx<Vth ("NO" in S106), the coordinate generating unit 48 judges that the panel is in the non-contact state. Subsequently, in Step S104, the multi-touch judgment unit 42 updates the reference panel current IPxo using the panel current IPx thus measured (S108). Subsequently, the flow returns to Step S100.

The above is a specific flow of the processing performed by the control circuit 100.

With the input apparatus 2, the single-touch state and the multi-touch state can be appropriately distinguished. Thus, the input apparatus 2 is capable of generating point coordinates in both states. Furthermore, the input apparatus 2 according to the embodiment has the following advantages.

In Step S108, the reference panel current IPxo is updated. Thus, such an arrangement reduces the effects of time-related deterioration or fluctuations in temperature on the touch panel 4. That is to say, if the resistance values of the first resistive film RF1 and the second resistive film RF2, and the contact resistance between them, change due to deterioration or fluctuations in temperature, the reference current IPxo also changes according to the change in the resistance values. Accordingly, if a fixed value is used as the value of the reference current IPxo, such an arrangement leads to false detection of the multi-touch state. Alternatively, this leads to error in the distance ΔX between the two points. In contrast, by updating the reference current IPxo in the processing, such an arrangement is capable of appropriately solving such a problem.

Furthermore, such an arrangement in which the distance ΔX between the two points is determined using the current difference (IPx–IPxo) in the multi-touch state has the following advantage. As described above, the impedance of the panel changes due to time-related deterioration or fluctuations in temperature. In this case, even if the user touches the panel at the same coordinates, the panel current IPx changes. In order to solve such a problem, by calculating the current difference, such an arrangement reduces the effects of time-related deterioration and fluctuations in temperature. Thus, such an arrangement provides precise coordinate detection.

Figure 5:
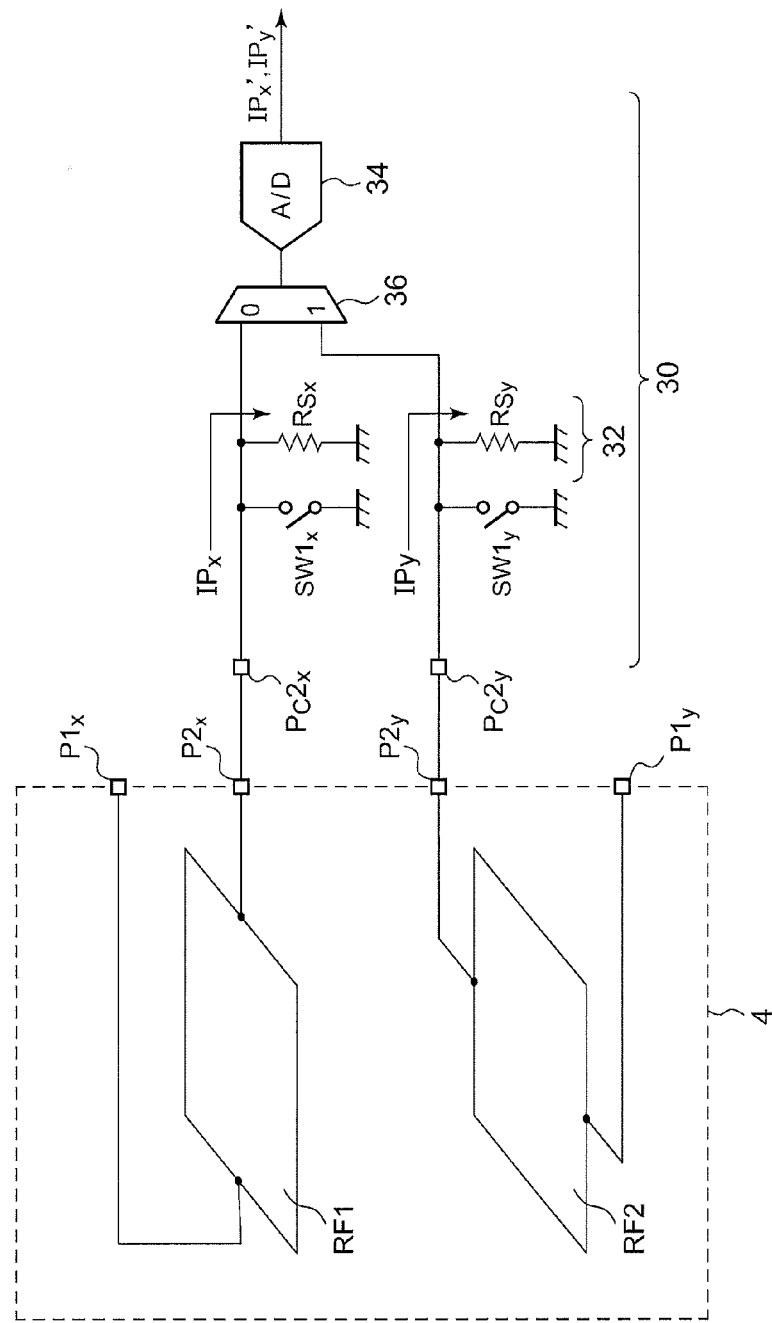
FIG. 5 is a circuit diagram showing an example configuration of a current detection unit shown in FIG. 1.

FIG. 5 is a circuit diagram which shows an example configuration of the current detection unit 30 shown in FIG. 1. The current detection unit 30 includes detection resistors Rsx and Rsy, bypass switches SW1x and SW1y, a selector 36, and an A/D converter 34. The detection resistors Rsx and Rsy correspond to the I/V conversion unit 32 shown in FIG. 1.

The detection resistor Rsx and the bypass switch SW1x are used to detect the coordinate in the X-axis direction, and the detection resistor Rsy and the bypass switch SW1y are used to detect the coordinate in the Y-axis direction. The circuit blocks used to detect the X-axis coordinate and the Y-axis coordinate have the same configuration. Accordingly, description will be made below only regarding an arrangement used to detect the coordinate in the X-axis direction.

The detection resistor Rsx is provided as an extension to a path that includes the first terminal P1x, the first resistive film RF1, and the second terminal P2x. Specifically, one terminal of the detection resistor Rsx is grounded, and is set to a fixed electric potential. The other terminal thereof is connected to the second terminal Pc2x.

The bypass switch SW1x is arranged in parallel with the corresponding detection resistor Rsx. Specifically, one terminal of the bypass switch SW1x is grounded, and the other terminal thereof is connected to the second terminal Pc2x.

When the voltage detection unit 20 detects the panel voltage VPx, the bypass switch SWx is turned on. In this state, the detection resistor Rs does not affect the combined impedance of the touch panel 4. Thus, such an arrangement is capable of measuring the panel voltage VPx with high precision.

When the current detection unit 30 detects the panel current IPx, the bypass switch SWx is turned off. In this state, a voltage drop (Rsx×IPx) which is proportional to the panel current IPx occurs at the detection resistor Rsx. When the coordinate in the X-axis direction is to be detected, the terminal (0) side of the selector 36 is on, and when the coordinate in the Y-axis direction is to be detected, the terminal (1) side of the selector 36 is on. The A/D converter 34 converts the voltage drop across the detection resistor Rsx into a digital value. The digital value thus converted represents a value that corresponds to the panel current IPx.

It should be noted that, when the ground voltage is used as the second bias voltage Vb2, such an arrangement allows the bypass switch SW1x to function as the voltage generating unit 10. That is to say, when the second bias voltage Vb2 is to be applied to the second terminal P2x, the bypass switch SW1x may preferably be turned on. The same can be said of the bypass switch SW1y.

Figure 6:
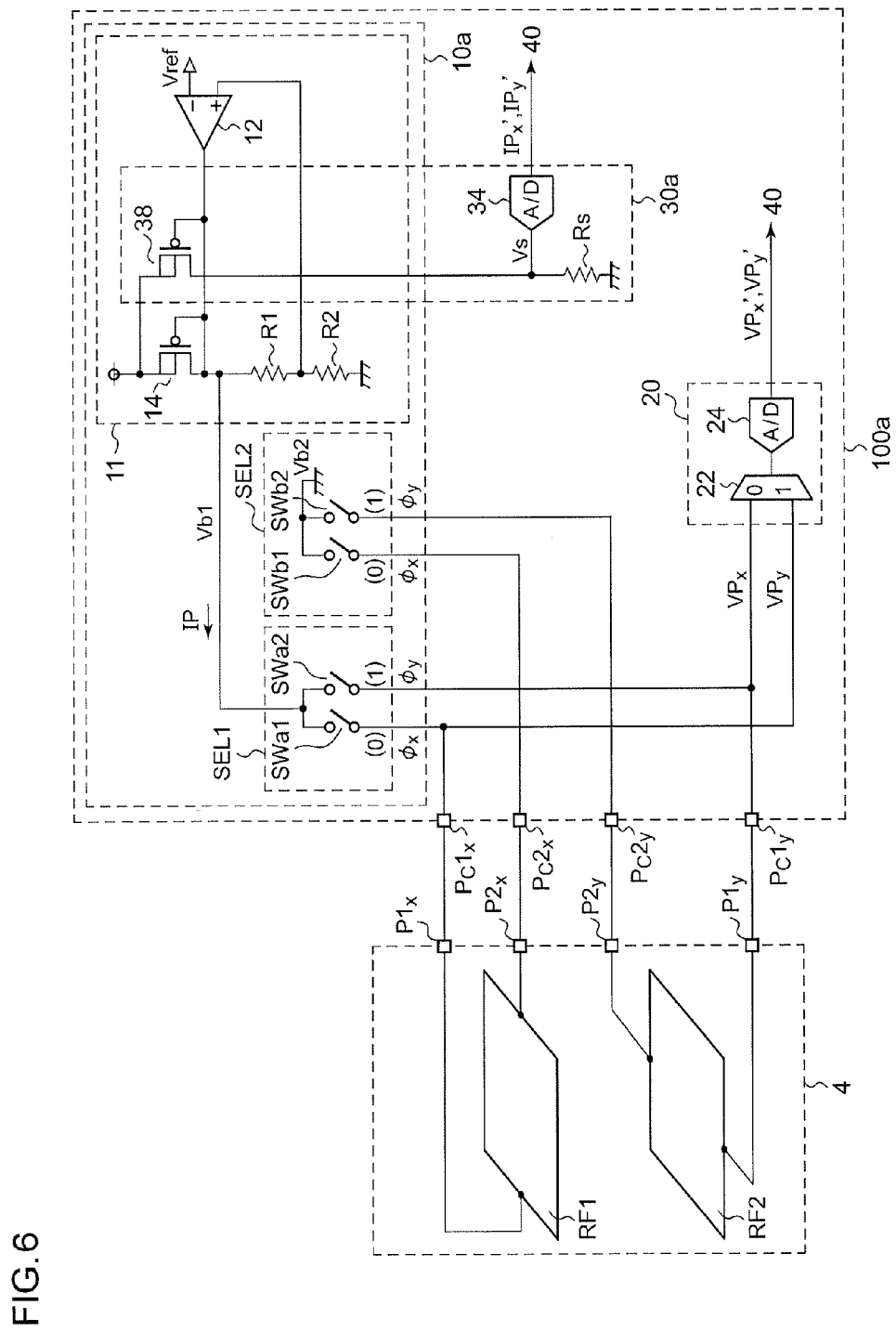
FIG. 6 is a circuit diagram showing another example configuration of the control circuit shown in FIG. 1.

FIG. 6 is a circuit diagram showing another example configuration of a part of the control circuit shown in FIG. 1.

A voltage generating unit 10a of a control circuit 100a includes a regulator 11, a first selector SEL1, and a second selector SEL2.

With the regulator 11 and the first selector SEL1, the first bias voltage Vb1 is generated. In the first state φ1, the first bias voltage Vb1 thus generated is applied to the first terminal P1x. In the second state φ2, the first bias voltage Vb1 thus generated is applied to the third terminal P1y.

The regulator 11 is configured to generate the first bias voltage Vb1 according to a reference voltage Vref. The regulator 11 is configured as a typical linear regulator including an operational amplifier 12, an output transistor 14, a first resistor R1, and a second resistor R2. Accordingly, description of the configuration and the operation thereof will be omitted. The first bias voltage Vb1 is represented by the following Expression.

$$Vb1 = Vref \times (R1 + R2)/R2$$

Also, the value of the reference voltage Vref may be switched according to the first state φ1 and the second state φ2.

The first selector SEL1 is arranged to receive the first bias voltage Vb1 via its input terminal. Furthermore, the first selector SEL1 is arranged such that its first output terminal (0) is connected to the first terminal Pc1x, and its second output terminal (1) is connected to the third terminal Pc1y. The first selector SEL1 is configured such that its first output terminal (0) side is turned on in the first state φx, and its second output terminal (1) side is turned on in the second state φy. For example, the first selector SEL1 includes switches SWa1 and SWa2 configured to switch on and off in a complementary manner.

The second selector SEL2 is provided in order to supply the second bias voltage Vb2 to the touch panel 4. The second bias voltage Vb2 is configured as a ground voltage. The second selector SEL2 includes switches SWb1 and SWb2 configured to switch on and off in a complementary manner. The second selector SEL2 is configured such that the switch SWb1 is turned on in the first state φx, and the switch SWb2 is turned on in the second state φy.

The current detection unit 30a includes a detection transistor 38, a detection resistor Rs, and an A/D converter 34. The detection transistor 38 is connected to the output transistor 14 of the regulator 11 such that they form a current mirror circuit. A detection current Is flows through the detection transistor 38 in proportion to a current that flows through the output transistor 14, i.e., the panel current. With the mirror ratio of the current mirror circuit as K1, the relation Is=K1×IP holds true.

The detection resistor Rs is arranged on a path of the detection transistor 38. A voltage drop Vs develops at the detection transistor Rs in proportion to the detection current Is, which is proportional to the panel current IP.

$$Vs = Rs \times Is = Rs \times K1 \times IP.$$

The A/D converter 34 is configured to convert the voltage drop Vs that occurs at the detection resistor Rs into a digital value, and to output the digital value in the form of a digital signal IPx' or IPy' which represents the panel current IP.

The control circuit 100a shown in FIG. 6 has the following advantages in comparison with the current detection unit 30 shown in FIG. 5.

With the control circuit 100a shown in FIG. 6, the detection resistor Rs, which is provided in order to convert the panel current IP into a voltage, is not directly connected to the touch panel 4. Thus, such an arrangement is capable of detecting the panel current IP without affecting the panel voltage VP.

In contrast, in a case of employing the current detection unit 30 shown in FIG. 5, there is a need to switch its state between a state in which the bypass switch SW1x (or SW1y) is turned on in order to measure the panel voltage VPx (or VPy) and a state in which the bypass switch SW1x (or SW1y) is turned off in order to measure the panel current IPx (or IPy). In some cases, such an arrangement requires a long period of time to detect the coordinates. Furthermore, the panel voltage VPx and the corresponding panel current IPx (or VPy and IPy) are measured at different timings, which degrades the precision of the coordinate detection.

In contrast, with the control circuit 100a shown in FIG. 6, the panel voltage and the panel current are detected simultaneously in a parallel manner. Such an arrangement provides improved processing speed. Thus, such an arrangement is suitably employed in an application which requires high-speed processing. Furthermore, such an arrangement is capable of parallel simultaneous acquisition of two parameters which are required to determine the coordinates, i.e., the current and the voltage, thereby allowing the coordinates to be determined with high precision.

In some cases, depending on the kind of panel, the difference ΔI between the panel current when the user touched a single point and the panel current when the user touched two points is very small. In this case, with the control circuit 100 shown in FIG. 5, in a case in which the current difference ΔI=200 μA, and the detection resistor Rs=200Ω, the change in the voltage drop ΔV is only 40 mV, for example. Such an arrangement requires the A/D converter 34 to have high resolution. This leads to difficulty in the design, or otherwise leads to an increased cost.

In contrast, with the control circuit 100a shown in FIG. 6, by optimizing the mirror ratio K1, such an arrangement secures a sufficient amount of change ΔV of the voltage drop Vs that occurs at the detection resistor Rs. Thus, such an arrangement allows the A/D converter 34 to have a reduced required resolution.

The current detection unit 30a may be configured to switch the mirror ratio K1 of the mirror circuit comprising the output transistor 14 and the detection transistor 38 according to the first state φx and the second state φy. Also, the detection resistor Rs may be configured as a variable resistor. With such an arrangement, the current detection unit 30a may be configured to switch the resistance value of the detection resistor Rs instead of or otherwise in addition to the switching of the mirror ratio, according to the first state φx and the second state φy.

In a case in which there is a large difference between the vertical length of the touch panel 4 and its horizontal length, i.e., in a case in which the touch panel 4 is configured with a large aspect ratio, in some cases, there is a difference between the combined resistance in the vertical direction and that in the horizontal direction. In this case, it is assumed that this leads to a difference in the panel current ranges of the panel current IPx that flows in the X direction and the panel current IPy that flows in the Y direction. In this case, by switching the mirror ratio K1 or otherwise the detection resistor Rs according to the first state φx and the second state φy, such an arrangement is capable of providing matching of the voltage ranges for the voltage drops Vs that occur at the detection resistor Rs. Thus, such an arrangement allows the A/D converter 34 configured as a shared A/D converter to perform processing with high precision.

The output transistor 14 and the detection transistor 38 shown in FIG. 6 form a current mirror circuit. Also, such a current mirror circuit may be configured as a cascode current mirror circuit. Such an arrangement provides improved precision of current duplication, i.e., improved precision of mirror ratio.

Figure 7:
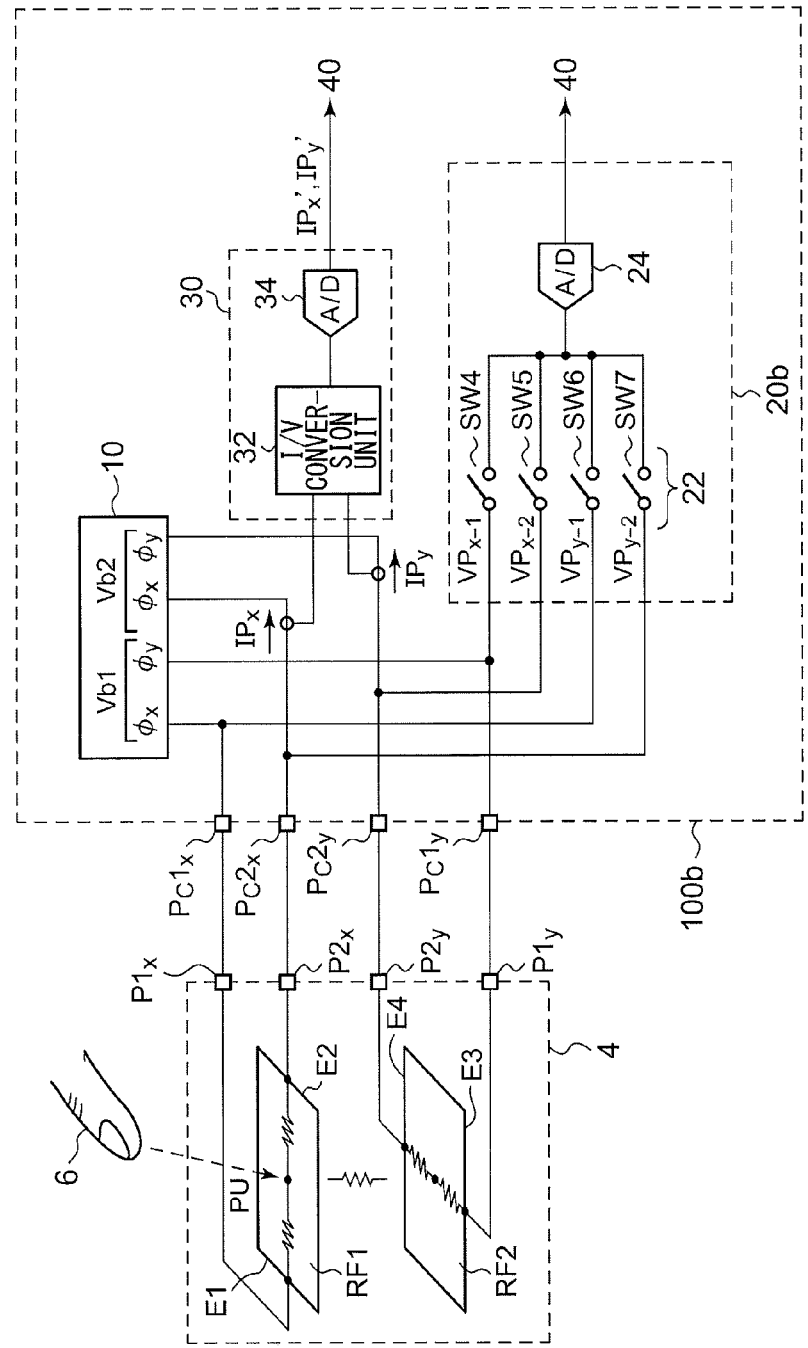
FIG. 7 is a circuit diagram showing yet another example configuration of the control circuit shown in FIG. 1.

FIG. 7 is a circuit diagram showing a modification of the control circuit shown in FIG. 1. There is a difference in the panel voltage VP processing between the control circuit 100b shown in FIG. 7 and the control circuit 100 shown in FIG. 1. That is to say, the voltage detection unit 20 shown in FIG. 1 is configured to detect the panel voltage VPx that occurs at the third terminal P1y in the first state ϕx, and to detect the panel voltage VPy that occurs at the first terminal P1x in the second state ϕy. In contrast, the voltage detection unit 20b shown in FIG. 7 is configured to separately detect the panel voltages VPx_1 and VPx_2 that respectively develop at the third terminal P1y and the fourth terminal P2y in the first state ϕx. Furthermore, the voltage detection unit 20b is configured to separately detect the panel voltages VPy_1 and VPy_2 that respectively develop at the first terminal P1x and the second terminal P2x in the second state ϕy.

The voltage detection unit 20b includes switches SW4 through SW7, and an A/D converter 24. The switches SW4 through SW7 correspond to the selector 22 shown in FIG. 1.

In the first state ϕx, first, the switch SW4 is turned on, and the other switches are turned off. In this state, the panel voltage VPx_1 that occurs at the third terminal P1y is measured. Subsequently, the switch SW5 is turned on, and the other switches are turned off. In this state, the panel voltage VPx_2 that occurs at the fourth terminal P2y is measured. The calculation unit 40 (not shown) arranged as a downstream circuit is configured to determine the X-coordinate of the point PU which the user touched, based on the two panel voltages VPx_1 and VPx_2 and the panel current IPx.

In the same way, in the second state ϕy, first, the switch SW6 is turned on, and the other switches are turned off. In this state, the panel voltage VPy_1 that develops at the first terminal P1x is measured. Subsequently, the switch SW7 is turned on, and the other switches are turned off. In this state, the panel voltage VPy_2 that develops at the second terminal P2x is measured. The calculation unit 40 (not shown) arranged as a downstream circuit is configured to determine the Y-coordinate of the point PU which the user touched, based on the two panel voltages VPy_1 and VPy_2 and the panel current IPy.

With such a modification, the panel voltage is measured at the two terminals in the first state ϕx and the second state ϕy, and the X-coordinate and the Y-coordinate are determined based on the panel voltages thus measured. Thus, such a modification provides improved precision of the coordinate detection.

Also, the features of the modification shown in FIG. 7 may be combined with the control circuit shown in FIG. 6.

The touch panels 4 to be controlled by the control circuit 100 have various characteristics. Specifically, the contact resistance values of the first resistive film RF1 and the second resistive film RF2 of the touch panel 4 largely vary depending on the kind of touch panel. In particular, there is a tendency for a touch panel 4 prepared as a low-cost touch panel to have a large contact resistance. Specifically, certain kinds of touch panels have a small contact resistance of several hundreds of Ω or less. However, other kinds of touch panels have a large contact resistance of several tens of kΩ.

Figure 8:
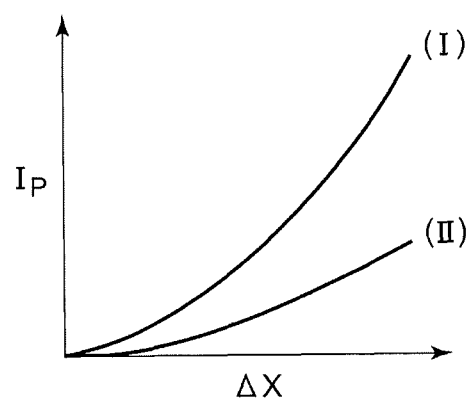
FIG. 8 is a graph showing the relation between the distance between the two points touched in the multi-touch state and the detection current that flows through the touch panel.

FIG. 8 is a graph showing the relation between the distance ΔX between the two points in the multi-touch state and the detection current Ip that flows through the touch panel 4. The curve (I) represents a case in which the touch panel 4 has a small contact resistance. In contrast, the curve (II) represents a case in which the touch panel 4 has a large contact resistance. As can be clearly understood from FIG. 2A, as the contact resistances $Rc_1$ and $Rc_2$ become lower, the degree to which the resistance component of the second resistive film RF2 contributes to the combined resistance formed between the terminals P1x and P2x becomes higher. Thus, in a case of employing a touch panel having a large contact resistance, the panel current Ip is small when a multi-touch operation is performed. That is to say, such an arrangement provides only a small change in the panel current Ip according to a change in the distance ΔX between the two points. This leads to difficulty in detecting the distance ΔX between the two points.

Description will be made below regarding a control circuit which is capable of detecting the distance ΔX between two points even in a case in which the touch panel 4 has a large contact resistance.

Figure 9:
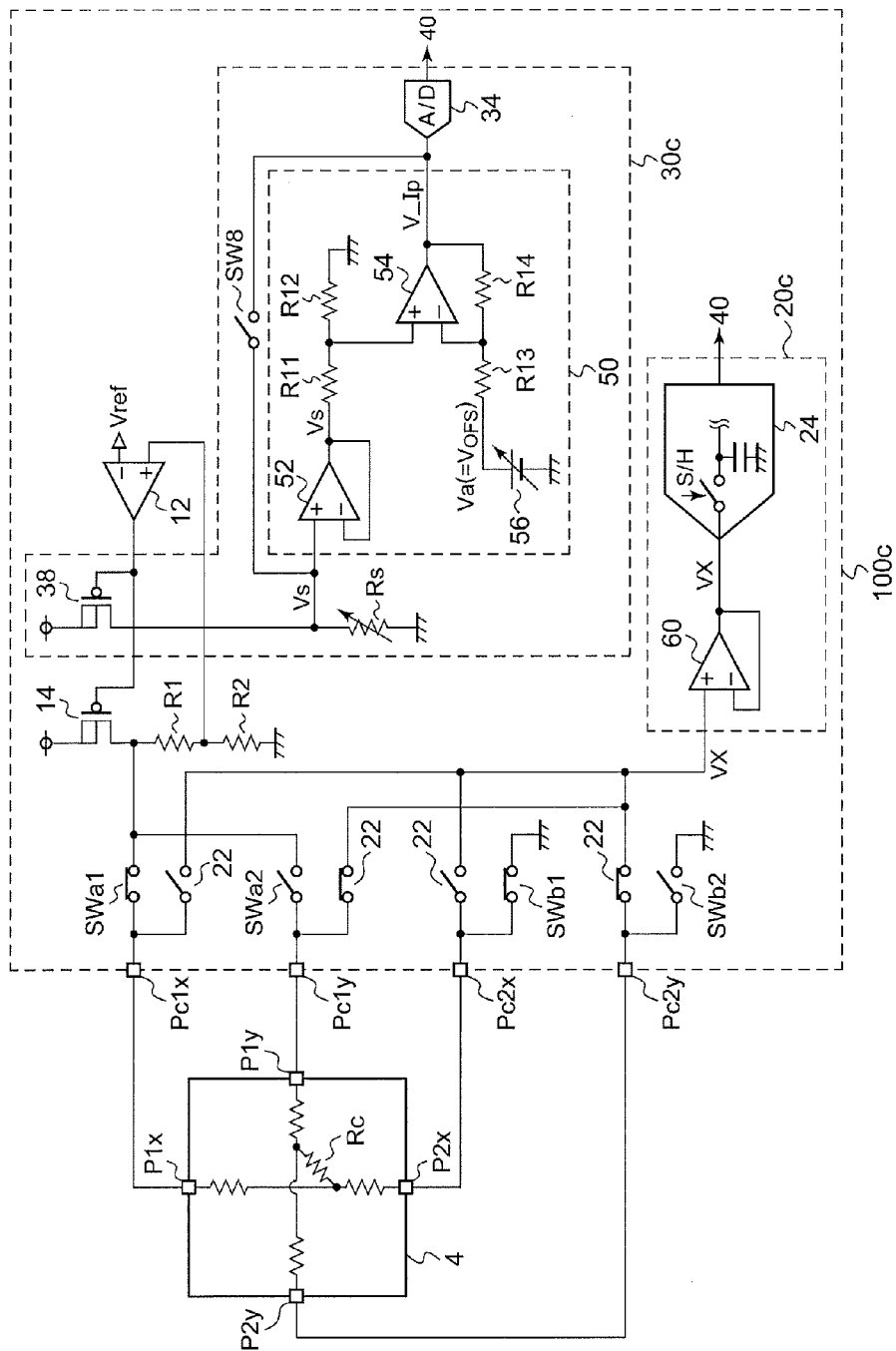
FIG. 9 is a circuit diagram showing a modification of the control circuit shown in FIG. 6.

FIG. 9 is a circuit diagram showing a modification of the control circuit shown in FIG. 6. A control circuit 100c shown in FIG. 9 further includes an amplifier circuit 50, a switch SW8, and buffer 60, in addition to the configuration shown in FIG. 6.

The amplifier circuit 50 is provided to a current detection unit 30c. The amplifier circuit 50 is configured to amplify, with a gain A, the difference between the voltage drop (detection voltage) $V_S$ that occurs at the detection resistor $R_S$ and a predetermined offset voltage $V_{OFS}$, and to output the voltage thus amplified as a voltage value V_Ip which represents the panel current Ip.

$$V\_Ip = A \times (V_S - V_{OFS}) \quad (1)$$

Specifically, the amplifier circuit 50 includes a buffer 52, an operational amplifier 54, a first resistor R11 through a fourth resistor R14, and a voltage source (D/A converter) 56. The voltage source 56 is configured to generate a predetermined voltage Va according to the input digital value. The buffer 52 is configured as a voltage follower configured to receive the detection voltage $V_S$ that occurs at the detection resistor $R_S$. The first resistor R11 is arranged between the output terminal of the buffer 52 and the first input terminal of the operational amplifier 54. The second resistor R12 is arranged between the first input terminal of the operational amplifier 54 and a fixed voltage terminal (ground terminal). The third resistor R13 is arranged such that a predetermined voltage Va is received via one end thereof, and the other end thereof is connected to the second input terminal of the operational amplifier 54. The fourth resistor R14 is arranged between the second input terminal of the operational amplifier 54 and the output terminal of the operational amplifier 54.

With the amplifier circuit 50, the gain A and the offset voltage $V_{OFS}$ are represented by the following Expressions (2) and (3), respectively.

$$A = R12 \times (R13 + R14) / (R13 \times (R11 + R12)) \quad (2)$$

$$V_{OFS} = R14 \times (R11 + R12) / (R12 \times (R13 + R14)) \times Va \quad (3)$$

In a case in which R11=R13=R1, and R12=R14=R2, the following Expressions (2a), (3a), and (4) hold true.

$$A = R2/R1 \quad (2a)$$

$$V_{OFS} = Va \quad (3a)$$

$$V\_Ip = R2/R1 \times R1(V_S - Va) \quad (4)$$

The current detection unit 30c includes a buffer 60 arranged as an upstream stage of the A/D converter 24. The buffer 60 is configured as a voltage follower configured to receive the panel voltage VP via the selector 22. The A/D converter 24 is configured to sample and hold the output voltage VX of the buffer 60, and to convert the value thus sampled and held into a digital value. Typically, a switch and a capacitor are provided as the input stage of the A/D converter 24.

The switch SW8 is arranged between the input terminal of the amplifier circuit 50 and the output terminal thereof. When the switch SW8 is turned on, the amplifier circuit 50 is bypassed.

The above is the configuration of the control circuit 100c. Next, description will be made regarding an example of a calibration operation thereof. First, the resistance value of the detection resistor $R_S$ is optimized according to the resistance value of the touch panel 4, i.e., according to the panel current IP. With such a calibration operation, the range of the detection voltage $V_S$ is optimized.

Furthermore, the voltage Va, i.e., the offset voltage $V_{OFS}$, is optimized. When an initial current $I_{init}$ flows through the touch panel 4 in a state in which the user does not touch the touch panel 4, an initial voltage $V_{init}$ occurs at the detection resistor $R_S$ as represented by the following Expression (5).

$$V_{init} = R_S \times K1 \times I_{init} \quad (5)$$

In this state, the switch SW8 is turned on, which sets the voltage $V\_Ip$ to $V_{init}$. The A/D converter 34 converts the initial voltage $V_{init}$ into a digital value that corresponds to the initial value $V_{init}$. Furthermore, the digital value thus obtained is supplied to the voltage source 56 such that the voltage Va becomes equal to the initial voltage $V_{init}$.

Also, an arrangement may be made in which, instead of turning on the switch SW8, the voltage Va is set to zero. In this case, the A/D converter 34 measures the voltage value $V\_Ip$ as represented by the following Expression (6).

$$V\_Ip = R2/R1 \times V_{init} \quad (6)$$

The initial voltage $V_{init}$ can be calculated based on the voltage value $V\_Ip$ thus measured. Also, a digital value may be supplied to the voltage source 56 such that Va becomes equal to $V_{init}$.

When the user has touched the touch panel 4 in an actual operating state, the detection voltage $V_S$ is represented by the following Expression (7).

$$V_S = (I_{init} + \Delta I) \times R_S = V_{init} + \Delta V \quad (7)$$

Thus, the following Expression (8) is derived.

$$V\_Ip = A \times (V_S - Va) = A \times (V_{init} + \Delta V - V_{init}) = A \times \Delta V \quad (8)$$

That is to say, the voltage value $V\_Ip$ is proportional to the change in current $\Delta I$ that occurs due to the user touching the touch panel 4.

As the contact resistance becomes large, the change in current $\Delta I$ that occurs due to the user touching the touch panel 4 becomes smaller. With the present embodiment, the change in voltage $\Delta V$ that corresponds to the change in current $\Delta I$ is amplified by means of the amplifier circuit 50. Thus, such an arrangement is capable of detecting the distance $\Delta X$ between two points with higher precision even if the touch panel 4 has a large contact resistance.

In a situation in which the touch panel 4 has a large contact resistance, in a case in which the buffer 60 is not provided, the capacitor of the input stage of the A/D converter 24 is charged via the resistance component of the touch panel 4. Thus, in a case in which the touch panel 4 has a large contact resistance, this leads to a reduction in the charging speed. This involves a long period of time required for a sample and hold operation, leading to a problem of a reduced response speed in the coordinate detection.

In contrast, the control circuit 100c shown in FIG. 9 includes the buffer 60 having a low output impedance, thereby raising the charging speed. Such an arrangement provides a reduced sample and hold time, thereby raising the response speed for the coordinate detection.

Description has been made regarding the present invention with reference to the embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made regarding an arrangement in which, in the multi-touch state, the coordinate generating unit 48 determines the coordinates X1 and X2 to be detected, assuming that the coordinate X3 that corresponds to the panel voltage VPx matches the midpoint between the two points PU1 and PU2. However, the present invention is not restricted to such an arrangement. Also, such an arrangement may employ a more complex algorithm.

Description has been made in the embodiment regarding an arrangement in which the first state φx and the second state φy share a part of the control circuit 100 shown in FIG. 1. Also, separate components may be provided for the first state φx and the second state φy. Also, the present invention may be applied to the X-direction detection alone or the Y-direction detection alone.

Description has been made in the embodiment regarding an arrangement configured to control the four-line touch panel 4. However, the present invention is not restricted to such an arrangement. Also, the present invention may be applied to the touch panel 4 having other configurations.

Description has been made in the embodiment regarding an arrangement in which the coordinates of two points are detected in the multi-touch state for exemplary purposes. However, such a multi-touch detection operation may be extended to detection of three or more points in the multi-touch state, which can be readily conceived by those skilled in this art, and which is encompassed in the technical scope of the present invention.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a touch panel comprising a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal, the control circuit comprising:

a voltage generating unit configured to apply a predetermined first bias voltage and a predetermined second bias voltage to the first and second terminals, respectively;

a voltage detection unit configured to detect a panel voltage that occurs at the third terminal;

a current detection unit configured to detect a panel current that flows through a path including the first terminal, the first resistive film, and the second terminal; and a coordinate determination unit configured to detect coordinates which a user touched, based on the panel voltage and the panel current, wherein the voltage generating unit comprises a regulator configured to apply the first bias voltage to the first terminal, the regulator including an output transistor arranged on the path including the first terminal, the first resistive film, and the second terminal; and and wherein the current detection unit comprises:
- a detection transistor connected to the output transistor such that they form a current mirror circuit;
- a detection resistor arranged on a path of the detection transistor; and the detection resistor and a predetermined voltage, and to output the difference thus amplified as a value which represents the panel current, wherein the amplifier circuit comprises:
- a buffer configured to receive the voltage drop across the detection resistor;
- an operational amplifier;
- a first resistor arranged between an output terminal of the buffer and a first input terminal of the operational amplifier;
- a second resistor arranged between the first input terminal of the operational amplifier and a fixed voltage terminal;
- a third resistor having one end supplied with the predetermined voltage, and having its other end connected to a second input terminal of the operational amplifier; and
- a fourth resistor arranged between the second input terminal of the operational amplifier and an output terminal of the operational amplifier.

2. A control circuit for a touch panel comprising a first terminal, a second terminal, a third terminal and a fourth terminal, a first resistive film having one edge connected to the first terminal and having another edge, which is opposite to the aforementioned edge, connected to the second terminal, and a second resistive film facing the first resistive film with a gap between them and having one edge connected to the third terminal and having another edge, which is opposite to the aforementioned edge, connected to the fourth terminal, the control circuit comprising:
- a voltage generating unit configured such that, in a first state, a predetermined first bias voltage and a predetermined second bias voltage are applied to the first and second terminals, respectively, and the third and fourth terminals are each set to a high impedance state, and such that, in a second state, the predetermined first and second bias voltages are applied to the third and fourth terminals, respectively, and the first and second terminals are each set to the high impedance state;
- a voltage detection unit configured to detect a panel voltage that occurs at one from among the third and fourth terminals in the first state, and to detect a panel voltage that occurs at one from among the first and second terminals in the second state;
- a current detection unit configured to detect a panel current that flows through a path including the first terminal, the first resistive film, and the second terminal in the first state, and to detect a panel current that flows through a path including the third terminal, the second resistive film, and the fourth terminal in the second state; and
- a coordinate determination unit configured to detect coordinates which the user touched, based on the values of the panel voltage and the panel current, wherein the voltage generating unit comprises:
- a regulator comprising an output transistor, and configured to generate the first bias voltage; and
- a selector, having its input terminal supplied with the first bias voltage, having its first output terminal connected to the first terminal, and having its second output terminal connected to the third terminal, and configured such that its first output terminal side is turned on in the first state and its second output terminal side is turned on in the second state, and wherein the current detection unit comprises:
- a detection transistor connected to the output transistor such that they form a current mirror circuit;
- a detection resistor arranged on a path of the detection transistor; and configured to amplify a difference between a voltage drop across the detection resistor and a predetermined voltage, and to output the difference thus amplified as a value which represents the panel current, wherein the amplifier circuit comprises:
- a buffer configured to receive the voltage drop across the detection resistor;
- an operational amplifier;
- a first resistor arranged between an output terminal of the buffer and a first input terminal of the operational amplifier;
- a second resistor arranged between the first input terminal of the operational amplifier and a fixed voltage terminal;
- a third resistor having one end supplied with the predetermined voltage, and having its other end connected to a second input terminal of the operational amplifier; and
- a fourth resistor arranged between the second input terminal of the operational amplifier and an output terminal of the operational amplifier.

3. A control circuit for a touch panel comprising a first terminal, a second terminal, a third terminal and a fourth terminal, a first resistive film having one edge connected to the first terminal and having another edge, which is opposite to the aforementioned edge, connected to the second terminal, and a second resistive film facing the first resistive film with a gap between them and having one edge connected to the third terminal and having another edge, which is opposite to the aforementioned edge, connected to the fourth terminal, the control circuit comprising:
- a voltage generating unit configured such that, in a first state, a predetermined first bias voltage and a predetermined second bias voltage are applied to the first and second terminals, respectively, and the third and fourth terminals are each set to a high impedance state, and such that, in a second state, the predetermined first and second bias voltages are applied to the third and fourth terminals, respectively, and the first and second terminals are each set to the high impedance state;
- a voltage detection unit configured to separately detect panel voltages that respectively occur at the third and fourth terminals in the first state, and to separately detect panel voltages that respectively occur at the first and second terminals in the second state;
- a current detection unit configured to detect a panel current that flows through a path including the first terminal, the first resistive film, and the second terminal in the first state, and to detect a panel current that flows through a path including the third terminal, the second resistive film, and the fourth terminal in the second state; and
- a coordinate determination unit configured to detect coordinates which the user touched, based on the values of the panel voltage and the panel current, wherein the voltage generating unit comprises:
- a regulator comprising an output transistor, and configured to generate the first bias voltage; and
- a selector, having its input terminal supplied with the first bias voltage, having its first output terminal connected to the first terminal, and having its second output terminal connected to the third terminal, and configured such that its first output terminal side is turned on in the first state and its second output terminal side is turned on in the second state, and wherein the current detection unit comprises:
a detection transistor connected to the output transistor such that they form a current mirror circuit;
a detection resistor arranged on a path of the detection transistor; and configured to amplify a difference between a voltage drop across the detection resistor and a predetermined voltage, and to output the difference thus amplified as a value which represents the panel current, wherein the amplifier circuit comprises:
a buffer configured to receive the voltage drop across the detection resistor;
an operational amplifier;
a first resistor arranged between an output terminal of the buffer and a first input terminal of the operational amplifier;
a second resistor arranged between the first input terminal of the operational amplifier and a fixed voltage terminal;
a third resistor having one end supplied with the predetermined voltage, and having its other end connected to a second input terminal of the operational amplifier; and
a fourth resistor arranged between the second input terminal of the operational amplifier and an output terminal of the operational amplifier.

4. The control circuit according to claim 1, wherein the voltage detection unit comprises:
a buffer configured to receive the panel voltage; and
an A/D converter configured to sample and hold an output voltage of the buffer, and to convert the value thus sampled and held into a digital value.

5. The control circuit according to claim 2, wherein the voltage detection unit comprises:
a buffer configured to receive the panel voltage; and
an A/D converter configured to sample and hold an output voltage of the buffer, and to convert the value thus sampled and held into a digital value.

6. The control circuit according to claim 3, wherein the voltage detection unit comprises:
a buffer configured to receive the panel voltage; and
an A/D converter configured to sample and hold an output voltage of the buffer, and to convert the value thus sampled and held into a digital value.

7. The control circuit according to claim 2, wherein the current detection unit is configured to be capable of switching, according to the first state and the second state, a mirror ratio of a mirror circuit that comprises the output transistor and the detection transistor.

8. The control circuit according to claim 3, wherein the current detection unit is configured to be capable of switching, according to the first state and the second state, a mirror ratio of a mirror circuit that comprises the output transistor and the detection transistor.

9. The control circuit according to claim 2, wherein the current detection unit is configured to be capable of switching, according to the first state and the second state, a resistance value of the detection resistor.

10. The control circuit according to claim 3, wherein the current detection unit is configured to be capable of switching, according to the first state and the second state, a resistance value of the detection resistor.

11. The control circuit according to claim 1, wherein the coordinate determination unit is configured to judge that the user is touching a plurality of points when the value of the panel current is greater than a predetermined value.

12. The control circuit according to claim 2, wherein the coordinate determination unit is configured to judge that the user is touching a plurality of points when the value of the panel current is greater than a predetermined value.

13. The control circuit according to claim 3, wherein the coordinate determination unit is configured to judge that the user is touching a plurality of points when the value of the panel current is greater than a predetermined value.

14. The control circuit according to claim 1, configured such that, when the user is touching two points, an interval between the coordinates of the two points is determined based on the value of the panel current.

15. The control circuit according to claim 2, configured such that, when the user is touching two points, an interval between the coordinates of the two points is determined based on the value of the panel current.

16. The control circuit according to claim 3, configured such that, when the user is touching two points, an interval between the coordinates of the two points is determined based on the value of the panel current.

17. The control circuit according to claim 14, configured to determine the interval between the coordinates of the two points based on a difference between the panel current measured when the user is not touching the panel and the panel current measured when the user touched the panel.

18. The control circuit according to claim 15, configured to determine the interval between the coordinates of the two points based on a difference between the panel current measured when the user is not touching the panel and the panel current measured when the user touched the panel.

19. The control circuit according to claim 16, configured to determine the interval between the coordinates of the two points based on a difference between the panel current measured when the user is not touching the panel and the panel current measured when the user touched the panel.

20. A control circuit for a touch panel comprising a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal, the control circuit comprising:
a voltage generating unit configured to apply a predetermined first bias voltage and a predetermined second bias voltage to the first and second terminals, respectively;
a voltage detection unit configured to detect a panel voltage that occurs at the third terminal;
a current detection unit configured to detect a panel current that flows through a path including the first terminal, the first resistive film, and the second terminal; and
a coordinate determination unit configured to detect coordinates which a user touched, based on the panel voltage and the panel current,
wherein the voltage generating unit comprises a regulator configured to apply the first bias voltage to the first terminal, the regulator including an output transistor arranged on the path including the first terminal, the first resistive film, and the second terminal; and
and wherein the current detection unit comprises:
a detection transistor connected to the output transistor such that they form a current mirror circuit;
a detection resistor arranged on a path of the detection transistor; and
an amplifier circuit configured to amplify a difference between a voltage drop across the detection resistor and a predetermined voltage, and to output the difference thus amplified as a value which represents the panel current, and wherein the control circuit is configured such that, when the user is touching two points, an interval between the coordinates of the two points is determined based on the value of the panel current, and wherein the coordinate determination unit is configured to determine a midpoint coordinate between the two points based on the panel voltage, to add a value that corresponds to the interval of the coordinates of the two points to the midpoint coordinate thus determined so as to determine one from among the coordinates of the two points, and to subtract a value that corresponds to the interval of the coordinates of the two points from the midpoint coordinate thus determined so as to determine the other of the coordinates of the two points.

21. A control circuit for a touch panel comprising a first terminal, a second terminal, a third terminal and a fourth terminal, a first resistive film having one edge connected to the first terminal and having another edge, which is opposite to the aforementioned edge, connected to the second terminal, and a second resistive film facing the first resistive film with a gap between them and having one edge connected to the third terminal and having another edge, which is opposite to the aforementioned edge, connected to the fourth terminal, the control circuit comprising:

a voltage generating unit configured such that, in a first state, a predetermined first bias voltage and a predetermined second bias voltage are applied to the first and second terminals, respectively, and the third and fourth terminals are each set to a high impedance state, and such that, in a second state, the predetermined first and second bias voltages are applied to the third and fourth terminals, respectively, and the first and second terminals are each set to the high impedance state;

a voltage detection unit configured to detect a panel voltage that occurs at one from among the third and fourth terminals in the first state, and to detect a panel voltage that occurs at one from among the first and second terminals in the second state;

a current detection unit configured to detect a panel current that flows through a path including the first terminal, the first resistive film, and the second terminal in the first state, and to detect a panel current that flows through a path including the third terminal, the second resistive film, and the fourth terminal in the second state; and a coordinate determination unit configured to detect coordinates which the user touched, based on the values of the panel voltage and the panel current, wherein the voltage generating unit comprises:
a regulator comprising an output transistor, and configured to generate the first bias voltage; and
a selector, having its input terminal supplied with the first bias voltage, having its first output terminal connected to the first terminal, and having its second output terminal connected to the third terminal, and configured such that its first output terminal side is turned on in the first state and its second output terminal side is turned on in the second state, and wherein the current detection unit comprises:
a detection transistor connected to the output transistor such that they form a current mirror circuit;
a detection resistor arranged on a path of the detection transistor; and
an amplifier circuit configured to amplify a difference between a voltage drop across the detection resistor and a predetermined voltage, and to output the difference thus amplified as a value which represents the panel current, and wherein the control circuit is configured such that, when the user is touching two points, an interval between the coordinates of the two points is determined based on the value of the panel current, and wherein the coordinate determination unit is configured to determine a midpoint coordinate between the two points based on the panel voltage, to add a value that corresponds to the interval of the coordinates of the two points to the midpoint coordinate thus determined so as to determine one from among the coordinates of the two points, and to subtract a value that corresponds to the interval of the coordinates of the two points from the midpoint coordinate thus determined so as to determine the other of the coordinates of the two points.

22. A control circuit for a touch panel comprising a first terminal, a second terminal, a third terminal and a fourth terminal, a first resistive film having one edge connected to the first terminal and having another edge, which is opposite to the aforementioned edge, connected to the second terminal, and a second resistive film facing the first resistive film with a gap between them and having one edge connected to the third terminal and having another edge, which is opposite to the aforementioned edge, connected to the fourth terminal, the control circuit comprising:

a voltage generating unit configured such that, in a first state, a predetermined first bias voltage and a predetermined second bias voltage are applied to the first and second terminals, respectively, and the third and fourth terminals are each set to a high impedance state, and such that, in a second state, the predetermined first and second bias voltages are applied to the third and fourth terminals, respectively, and the first and second terminals are each set to the high impedance state;

a voltage detection unit configured to separately detect panel voltages that respectively occur at the third and fourth terminals in the first state, and to separately detect panel voltages that respectively occur at the first and second terminals in the second state;

a current detection unit configured to detect a panel current that flows through a path including the first terminal, the first resistive film, and the second terminal in the first state, and to detect a panel current that flows through a path including the third terminal, the second resistive film, and the fourth terminal in the second state; and a coordinate determination unit configured to detect coordinates which the user touched, based on the values of the panel voltage and the panel current, wherein the voltage generating unit comprises:
a regulator comprising an output transistor, and configured to generate the first bias voltage; and
a selector, having its input terminal supplied with the first bias voltage, having its first output terminal connected to the first terminal, and having its second output terminal connected to the third terminal, and configured such that its first output terminal side is turned on in the first state and its second output terminal side is turned on in the second state, and wherein the current detection unit comprises:
a detection transistor connected to the output transistor such that they form a current mirror circuit;
a detection resistor arranged on a path of the detection transistor; and
an amplifier circuit configured to amplify a difference between a voltage drop across the detection resistor and a predetermined voltage, and to output the difference thus amplified as a value which represents the panel current, and wherein the control circuit is configured such that, when the user is touching two points, an interval between the coordinates of the two points is determined based on the value of the panel current, and wherein the coordinate determination unit is configured to determine a midpoint coordinate between the two points based on the panel voltage, to add a value that corresponds to the interval of the coordinates of the two points to the midpoint coordinate thus determined so as to determine one from among the coordinates of the two points, and to subtract a value that corresponds to the interval of the coordinates of the two points from the midpoint coordinate thus determined so as to determine the other of the coordinates of the two points.

23. A touch panel input apparatus comprising:
a touch panel comprising a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal; and
the control circuit according to claim 1, configured to control the touch panel.

24. A touch panel input apparatus comprising:
a touch panel comprising a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal; and
the control circuit according to claim 2, configured to control the touch panel.

25. A touch panel input apparatus comprising:
a touch panel comprising a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal; and
the control circuit according to claim 6, configured to control the touch panel.

26. An electronic device comprising a touch panel input apparatus, wherein the touch panel input apparatus comprises:
a touch panel comprising a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal; and
the control circuit according to claim 1, configured to control the touch panel.

27. An electronic device comprising a touch panel input apparatus, wherein the touch panel input apparatus comprises:
a touch panel comprising a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal; and
the control circuit according to claim 2, configured to control the touch panel.

28. An electronic device comprising a touch panel input apparatus, wherein the touch panel input apparatus comprises:
a touch panel comprising a first terminal, a second terminal, and a third terminal, a first resistive film having one edge connected to the first terminal and having another edge, which is opposite to the aforementioned edge, connected to the second terminal, and a second resistive film facing the first resistive film with a gap between them and having one edge connected to the third terminal; and
the control circuit according to claim 3, configured to control the touch panel.

* * * * *